United States Patent [19]

Jones et al.

[11] Patent Number: 6,009,519

[45] Date of Patent: Dec. 28, 1999

[54] METHOD AND APPARATUS FOR PROVIDING AUDIO UTILITY SOFTWARE FOR USE IN WINDOWS APPLICATIONS

[75] Inventors: Gary Jones; Leonard Shoell, both of Pleasant Grove, Utah

[73] Assignee: Andrea Electronics, Corp., Melville, N.Y.

[21] Appl. No.: 08/833,384

[22] Filed: Apr. 4, 1997

[51] Int. Cl.[6] .......................... G06F 9/445; G06F 15/163
[52] U.S. Cl. .............................. 713/1; 395/712; 713/100; 709/301
[58] Field of Search ..................................... 395/712, 651, 395/653, 681, 828, 830; 713/1, 100; 709/301; 710/8, 10

[56] References Cited

U.S. PATENT DOCUMENTS

| 4,931,950 | 6/1990 | Isle et al. ................................. | 364/513 |
| 5,721,951 | 2/1998 | DorEl ...................................... | 395/830 |
| 5,740,436 | 4/1998 | Davis et al. ............................. | 395/651 |

OTHER PUBLICATIONS

"How to use Microsoft Windows NT 4 Workstation", Gavron, Jacquelyn and Moran Joseph, 1996.
"Microsoft's Windows 95 Multimedia Initiative", Gussin, Lawrence, CD–ROM Professional Aug. 1995.

Primary Examiner—Ayaz R. Sheikh
Assistant Examiner—Tim T Vo
Attorney, Agent, or Firm—Frommer Lawrence & Haug LLP; Thomas J. Kowalski

[57] ABSTRACT

A method is provided for allowing a WINDOWS computer user to effectively utilize audio applications in a WINDOWS 95 or WINDOWS NT operating system by individually setting the controls of the computer sound card by an improved dialog-based tabbed menu system. Upon loading and starting the computer software system of the present invention in the WINDOWS based computer, the WINDOWS 95 or NT operating system is queried for the type of computer sound card driver installed. Next, the computer sound card driver software is queried to determine the capabilities and requirements of a computer sound card and is adjusted to meet the specifics capabilities and requirements of the computer sound card detected. Further, the present software system allows the user to conveniently organize dialog-based tabbed menus for controlling the computer sound card settings with provision for simplifying the configuration of microphone related settings. Further, the present invention includes a built-in validation capability which alerts the user when improper related settings are detected and provides the user an easy method of correction.

23 Claims, 7 Drawing Sheets ns,
which substantially
METHOD AND APPARATUS FOR PROVIDING AUDIO UTILITY SOFTWARE FOR USE IN WINDOWS APPLICATIONS

FIELD OF THE INVENTION

The present invention relates to method and apparatus for allowing a user to efficiently display and adjust computer sound card settings, such as the volume, playback, and recordings settings, which effect the quality of sound of audio applications run on a WINDOWS computer utilizing a WINDOWS 95 or WINDOWS NT operating system.

The invention further relates to a software system that automatically detects improper microphone related computer sound card settings after detecting the type of computer sound card installed in the computer and allows the user to quickly correct these improper settings by changing them individually or by forcing them collectively to nominal default values. The present invention allows the user to configure or re-configure the computer sound card settings and certain aspects of its dialog-based tabbed menu configuration at any time.

BACKGROUND OF THE INVENTION

As is to be appreciated, in the age of cyberspace, many different types of WINDOWS computers with WINDOWS 95 or WINDOWS NT operating systems are configured with many different computer sound cards, sound accessories, and sound applications software, each system requiring its own set of instruction manuals to fully describe the operation of the computer configuration. With many audio software applications, there exist an increasing need to simply the task the users must face when utilizing WINDOWS computers with the wide variety of available audio devices.

However, to utilize many of these audio applications now available in many computers equipped with audio devices such as headsets and handsets, speakers, and musical input and output devices, the computer sound card settings must be properly configured by the computer user to satisfy the unique requirements of the particular computer system. Many times, the user must consult the computer sound card, audio accessory, audio software application, and operating system instruction manuals to properly configure the computer sound card.

Even an experienced user may be overwhelmed with all the different computer sound card settings, and to expect the novice to read all the associated instruction manuals and understand which settings are correct and how to set them for effective sound performance is unrealistic. As a result, many users shy away from instruction manuals and fumble by trial and error to find the proper sound card setting or instead opt not to utilize some or all of the audio capabilities of the computer audio applications requiring microphones.

Thus, there is a need for a method that simplifies the process of configuring the computer sound card settings associated with audio applications of WINDOWS computer systems. The prior art has failed to provide a relatively easy means to ensure proper computer sound card settings when audio devices are used with computer sound cards and audio software applications to receive, process, and output accurate audio signals relating to telephony systems involving microphones. The prior art has further failed to provide a system for organizing user configurable dialog-based tabbed menus for controlling computer sound card settings and for alerting the user of improper microphone related computer sound card settings and quickly correcting improper computer sound card settings via internal means.

OBJECTS AND SUMMARY OF THE INVENTION

An object of the present invention is to provide a method of configuring the computer sound card settings of the audio system of a WINDOWS computer for effective use with audio driven applications running under WINDOWS 95 or WINDOWS NT operating systems, which substantially reduces or eliminates problems with the prior art.

More specifically, it is an object of the present invention to provide a software system that enables effective usage of audio devices including a microphone in connection with a WINDOWS computer having varying computer sound cards in a WINDOWS 95 or WINDOWS NT environment.

Another object of the present invention is to provide a method for configuring a WINDOWS computer for audio applications, comprising the steps of: providing a WINDOWS computer having a WINDOWS 95 or WINDOWS NT operating system with means to install data stored in a medium; installing the data stored in the medium to operate in a dialog-based menu format utilizing a smart icon on a taskbar tray; querying the operating system to detect a computer sound card software driver; querying the computer sound card software driver to determine the type of computer sound card installed; and inputting default or user selected settings pertaining to the operation of the computer sound card detected.

Another object of the present invention is to provide a relatively easy to use software system that alerts the user of a WINDOWS computer and a WINDOWS 95 or WINDOWS NT operating system of improper computer sound card settings which may adversely effect microphone performance.

Another object of the present invention is to provide the user of a WINDOWS computer and a WINDOWS 95 or WINDOWS NT operating system a relatively easy to use software system that provides the user a means to quickly correct improper computer sound card settings which may adversely effect microphone performance.

Another object of the present invention is to provide an enhanced user-friendly dialog-based tabbed menu system in a WINDOWS 95 or WINDOWS NT environment that contains the microphone related computer sound card settings required for proper microphone operation that typically include the balance, volume, and mute/select settings for the microphone related recording and playback functions utilized in audio applications.

Another object of the present invention is to provide a computerized system for controlling the computer sound card audio functions in a WINDOWS computer with WINDOWS 95 or WINDOWS NT operating system, comprising: a WINDOWS computer having a computer sound card means to provide a user the ability to perform certain audio applications; a data means installed in the computer to determine computer sound card capabilities and appropriate settings of the computer sound card; a plurality of tabbed dialog means displayed on a computer screen that allow the user to select which audio settings to manipulate for the certain audio application; an alert means displayed on the tabbed dialog means to notify the user of individual controls which are set improperly and may adversely effect microphone performance; a dialog pushbutton means to force all of the computer sound card microphone related settings to nominal default values; and an alert means displayed on the taskbar tray to notify the user of improper audio settings which may adversely effect microphone performance. In the preferred system, said audio functions typically comprise balance, volume, mute/select, and sometimes VU meter controls which are displayed in tabbed dialogs. In the preferred system, the tabbed dialog means comprise at least a microphone tabbed dialog and an options tabbed dialog or comprise a microphone tabbed dialog, a recording tabbed dialog, a playback tabbed dialog, and an options tabbed dialog. It is preferred that the microphone tabbed dialog controls a gain of a microphone input and other settings effecting microphone performance, while the recording tabbed dialog typically individually and collectively controls a plurality of computer sound card audio input settings and the playback tabbed dialog typically individually and collectively controls a plurality of computer sound card output settings. In addition, it is preferred that the options tabbed dialog controls the display of the recording tabbed dialog, playback tabbed dialog, and smart icon alert means displayed on the taskbar tray.

More specifically, it is another object of the present invention to provide the preferred default dialog which contains secondary tabbed dialogs consisting of a microphone tabbed dialog and an options tabbed dialog, where the microphone tabbed dialog is comprised of a recording box and a playback box. The contents of the preferred recording box in the microphone tabbed dialog depends upon the characteristics and requirements of the computer sound card and includes a recording group and a microphone group, where the recording group is typically comprised of balance, volume, mute/select and VU meter controls and the microphone group is typically comprised of balance, volume, and mute/select controls. In addition, the contents of the preferred playback box in the microphone tabbed dialog depends upon the characteristics and requirements of the computer sound card and typically includes volume control, wave, and option groups where the volume control group is typically comprised of balance, volume, and mute/select controls, where the wave group is typically comprised of balance, volume, mute/select, and VU meter controls, and where the options group is typically comprised of a control to prevent speaker feedback into the microphone. The preferred default dialog is expandable by user selection to include a recording tabbed dialog and/or a playback tabbed dialog. The contents of the recording tabbed dialog depends upon the characteristics and requirements of the computer sound card and is typically comprised of a recording group, a MIDI group, a CD audio group, a line-in group, and a microphone group where each group is typically comprised of a balance, volume, mute/select, and sometimes VU meter controls. The contents of the playback tabbed dialog depends upon the characteristics and requirements of the computer sound card and is typically comprised of a volume control group, a wave group, a MIDI group, a CD audio group, a line-in group, a microphone group, and a PC Speaker group where each group is typically comprised of a balance, volume, mute/select, and sometimes VU meter controls. An additional step of the method is to selectively establish a smart icon on the taskbar tray of the WINDOWS desktop to alert a user of an improper computer sound card setting possibly effecting microphone performance and to provide a set default means to allow the user to easily establish nominal values for all microphone related settings to promote effective microphone performance for audio applications using microphone input. The preferred options tabbed dialog allows the user to display the recording tabbed dialog and associated boxes and controls, the playback tabbed dialog and associated boxes and controls and/or a smart icon on the taskbar tray.

Other objects, features and advantages according to the present invention will become apparent from the following detailed description of the illustrated embodiments when read in conjunction with the accompanying drawings in which corresponding components are identified by the same reference numerals.

BRIEF DESCRIPTION OF THE APPENDICES

Appendix A contains the source code for the computer system of the present invention and is incorporated by reference herein. Appendix A contains eight modules, A1–A8.

Module A1 (Exhibit B) W contains an installation script of the present invention in a WINDOWS 95 or WINDOWS NT platform.

Module A2 (Exhibits C–D) contains an audio routine of the present invention in C++ in a WINDOWS 95 or WINDOWS NT platform.

Module A3 (Exhibits E–F) contains an hidden window routine of the present invention in C++ in a WINDOWS 95 or WINDOWS NT platform.

Module A4 (Exhibits G–H) contains an initialization dialogue routine of the present invention in C++ in a WINDOWS 95 or WINDOWS NT platform.

Module A4 (Exhibits I–J) contains a microphone control routine of the present invention in C++ in a WINDOWS 95 or WINDOWS NT platform.

Module A (Exhibits K–L) contains a microphone control dialogue routine of the present invention in C++ in a WINDOWS 95 or WINDOWS NT platform.

Module A6 (Exhibits M–N) contains a microphone property sheet routine of the present invention in C++ in a WINDOWS 95 or WINDOWS NT platform.

Module A7 (Exhibits O–P) contains an options dialogue routine of the present invention in C++ in a WINDOWS 95 or WINDOWS NT platform.

Module A8 (Exhibits Q–R) contains a standard system files routine of the present invention in C++ in a WINDOWS 95 or WINDOWS NT platform.

DETAILED DESCRIPTION OF THE PREFERRED EMBODIMENTS

Figure 1:
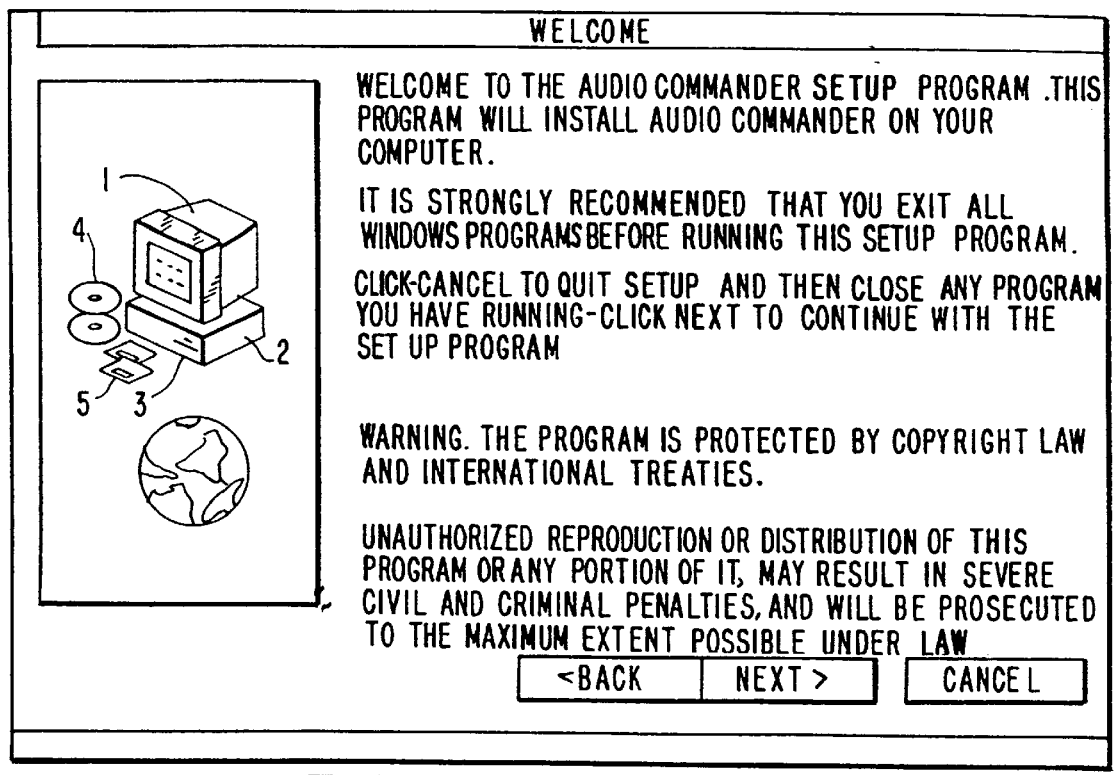
FIG. 1 is a representative screen display of one of the setup/installation steps illustrating a picture of a portion of the computer hardware utilized by the present invention.

FIG. 1 illustrates a computer monitor 1, a computer base unit 2 having a hard disk drive (not shown), a CD drive 3, a keyboard (not shown), a mouse (not shown) and cable connections (not shown) from the base unit 2 to the monitor 1 to an electrical power supply (not shown). The present invention is preferably available on a CD 4 or floppy disk(s) 5, which is inserted into the CD drive 3 or floppy disk drive (not shown), and installed onto the hard disk (not shown) of the base unit 2, and which operates under either a WINDOWS 95 or WINDOWS NT operating system. The present invention operates on a WINDOWS computer with WINDOWS 95 or WINDOWS NT operating system and quickly identifies and provides an easy method of correction of microphone related sound problems that commonly plague audio device users.

Figure 2:
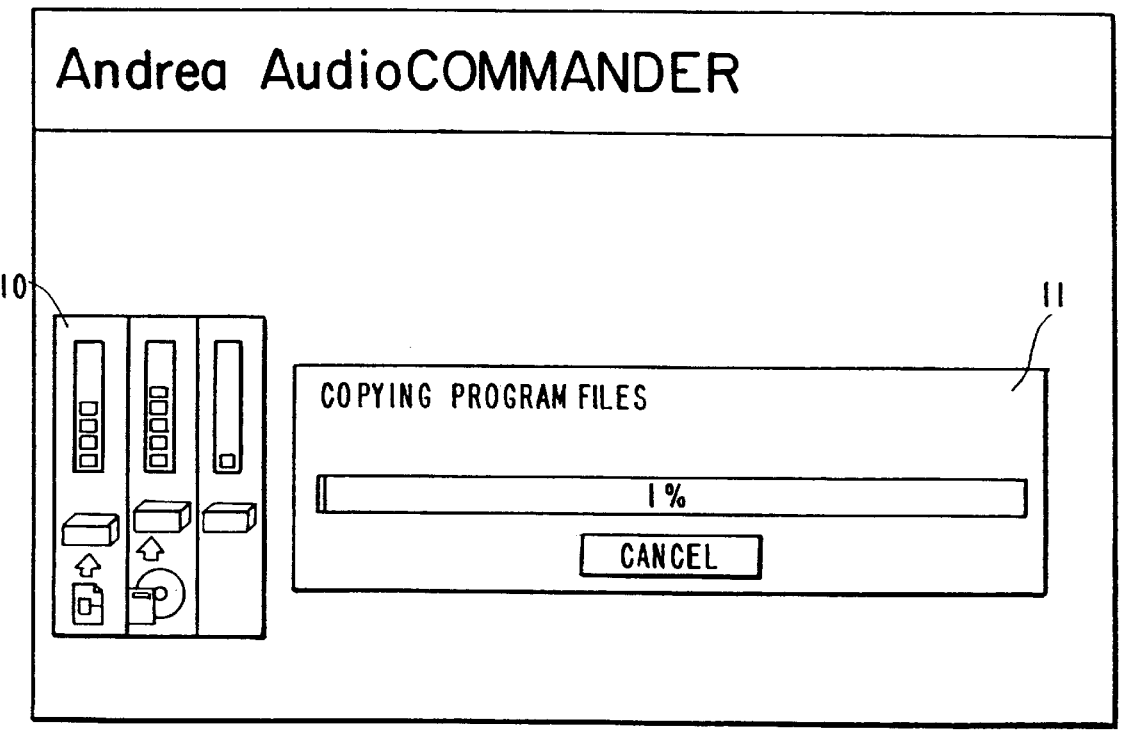
FIG. 2 is a representative screen display of one of the setup/installation steps illustrating installation progress indicators of the present invention.

In FIG. 2, as the information from the CD or floppy disk(s) is copied and installed onto the hard disk of the computer, progress is displayed by the progress indicators 10 and 11. After installation and upon startup, the present invention first queries the operating system to determine which computer sound card driver is installed. The computer sound card driver is then queried and software system of the present invention internally configures itself to support the detected computer sound card's specific capabilities and requirements. For instance in FIGS. 3–8, and 10 the Sound Blaster 16 computer sound card is detected, while in FIGS. 9 and 11, the ESS AudioDrive computer sound card is detected. The software system of the present invention may be uninstalled from the hard disk of the base unit 2 using the combined uninstallation features of the present invention and the WINDOWS 95 or WINDOWS NT operating system.

Figure 3:
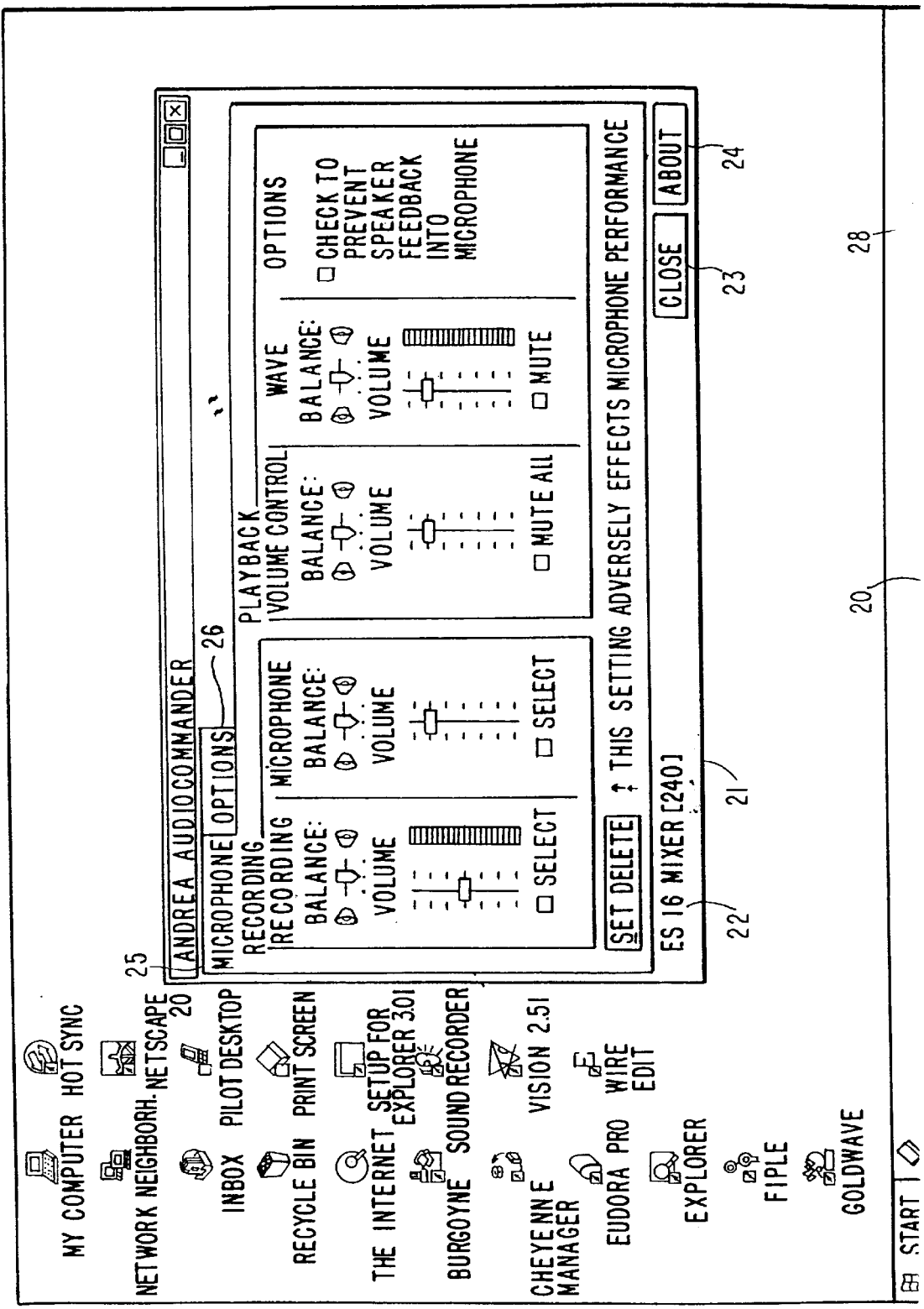
FIG. 3 is a representative screen display illustrating the WINDOWS computer screen with a main dialog containing tabbed dialogs, buttons, and computer sound card identifier and a smart icon on the taskbar tray.

In FIG. 3, the software system of the present invention has tabs for the quick selection of conveniently organized dialogs for displaying and adjusting computer sound card settings. When the software system of the present invention is installed and started for the first time, the system defaults to its simplest configuration with the desktop display 20 containing a main dialog 21 containing a close button 23, a about button 24, a computer sound card descriptor 22, and two tabbed dialogs: a selected tabbed dialog 25 for microphone related functions and a tabbed dialog 26 for options selection. If desired, the software system of the present invention will put a smart icon 28 on the taskbar tray 27 to be visible at all times in the lower right hand corner of the desktop display 20. The smart icon 28 performs a plurality of functions. When smart icon 28 is clicked on, the main dialog 21 is displayed within the desktop display 20. When the verification feature of the present computer system detects a computer sound card setting which may adversely effect microphone operation, the smart icon 28 changes its appearance on the taskbar tray 27 to alert the user of computer sound card settings which may adversely effect microphone performance.

Figure 4:
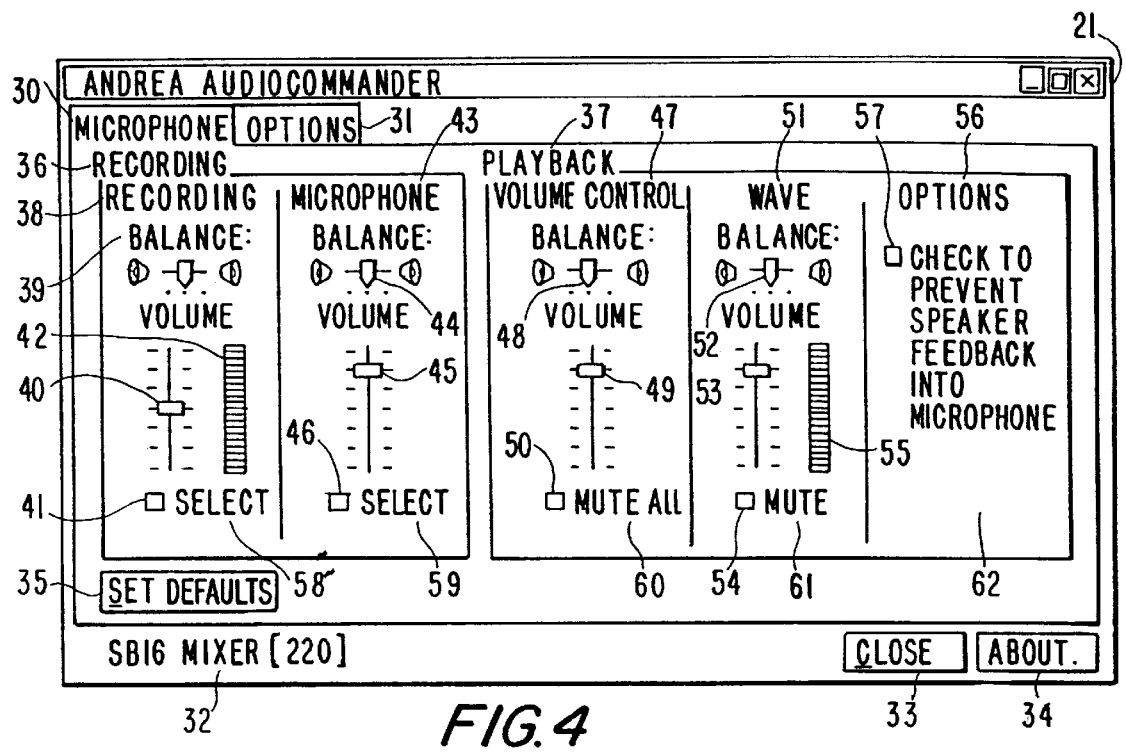
FIG. 4 is a representative screen display illustrating the features of the microphone tabbed dialog according to the present invention.

In FIG. 4, the selected microphone tabbed dialog 30 is displayed within main dialog 21. The computer sound card microphone related settings and functions contained within the microphone tabbed dialog 30 include a set defaults pushbutton 35 with a possible warning icon 71 and a warning message 35 (both shown in FIG. 5) and a plurality of controls arranged into a recording box 36 and a playback box 37. All of the controls contained in the recording box 36 and the playback box 37 are also contained in either the recording or the playback tabbed dialogs shown in FIGS. 8 or 10 and have been put in the microphone tabbed dialog 30 to bring all the controls that effect microphone performance together in one place to make it convenient for the user to adjust the computer sound card settings that are relevant to microphone operation.

In FIG. 4, the recording box 36 is displayed within the tabbed dialog 30 and is comprised of the recording group 58 and the microphone group 59. The recording group 58 includes a recording label 38, which identifies a balance control 39, a volume control 40, a select checkbox 41, and a VU meter 42. The VU meter 42 displays sound levels when the computer sound card is receiving audio input and passing it to an active application such as a sound recorder or voice recognition program. The imbalance control 39, the volume control 40*, and the select checkbox 41 typically effect all computer sound card audio inputs and are called master controls. This group of master controls are typically fixed at nominal values by the computer sound card driver and not adjustable by the user. The microphone group 59 includes a microphone label 43, which identifies a balance control 44, a volume control 45, and a select checkbox 46. Most computer sound cards support only monaural microphones and thus the microphone balance control 44 is typically fixed by the computer sound card driver at the center position and is not adjustable by the user. The volume control 45 provides control of the gain of the microphone input signal. The select checkbox 46 either enables or mutes the microphone input. When the select checkbox 46 is checked, the microphone input is enabled and when the checkbox 46 is not checked, the microphone input is muted.

In FIG. 4, the playback box 37 is displayed within the tabbed dialog 30 and is comprised of a volume control group 60, a wave group 61, and an options group 62. The volume control group 60 includes a volume control label 47, which identifies a balance control 48, a volume control 49, and a mute all checkbox 50. In the volume control group 60, the balance control 48, the volume control 49, and the mute all checkbox 50 typically effect computer sound card audio outputs regardless of the source of the signal and are called master controls. The wave group 61 includes a wave label 51 which identifies a balance control 52, a volume control 53, a mute checkbox 54, and a VU meter 55. The balance control 52, the volume control 53, and the mute checkbox 54 effect the audio played back from wave files. The VU meter 55 displays sound levels when wave files are played. The options group 62 includes an options label 56, which identifies a check to prevent speaker feedback into microphone checkbox 57. The check to prevent speaker feedback into microphone checkbox 57 of the options group 62 controls whether or not audio signals received from the microphone are routed directly to the computer sound card output. It is preferred that the check to prevent speaker feedback into microphone checkbox 57 be checked to avoid speaker feedback into the microphone by disabling the direct routing of the microphone input signal to the computer sound card output.

Figure 5:
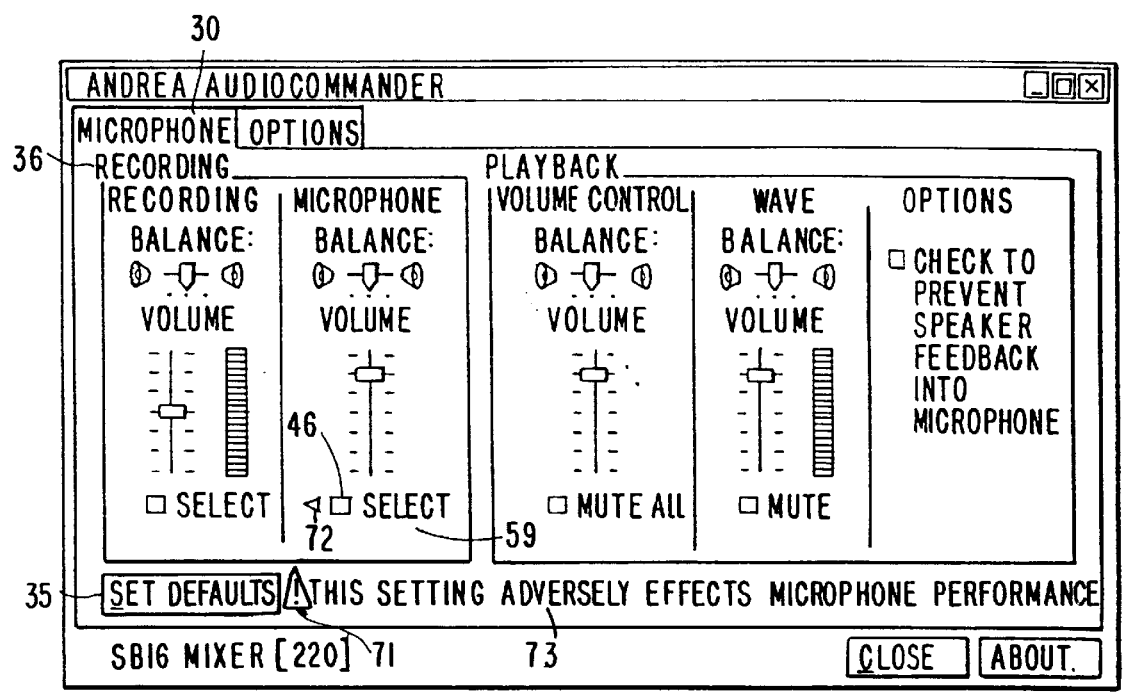
FIG. 5 is a representative screen display similar to FIG. 4, except an improper microphone related setting is illustrated.

As shown in FIG. 5, the present software system has a built-in validation capability that displays a yellow alert symbol in a plurality of locations when one or more of the microphone related controls is set improperly. For example, when the select checkbox 46 is not in the preferred checked condition which prevents proper microphone operation, a yellow alert symbol 46 appears next to the incorrectly set select checkbox 72 and a yellow alert symbol 71 appears to the right of the set defaults button 35 next to a descriptive message 73 describing the nature of the detected problem. The set defaults button 35 when operated forces all of the microphone related controls within the microphone tabbed dialog 30 to nominal settings which in turn causes the removal of any yellow alert symbols that have been displayed.

Figure 6:
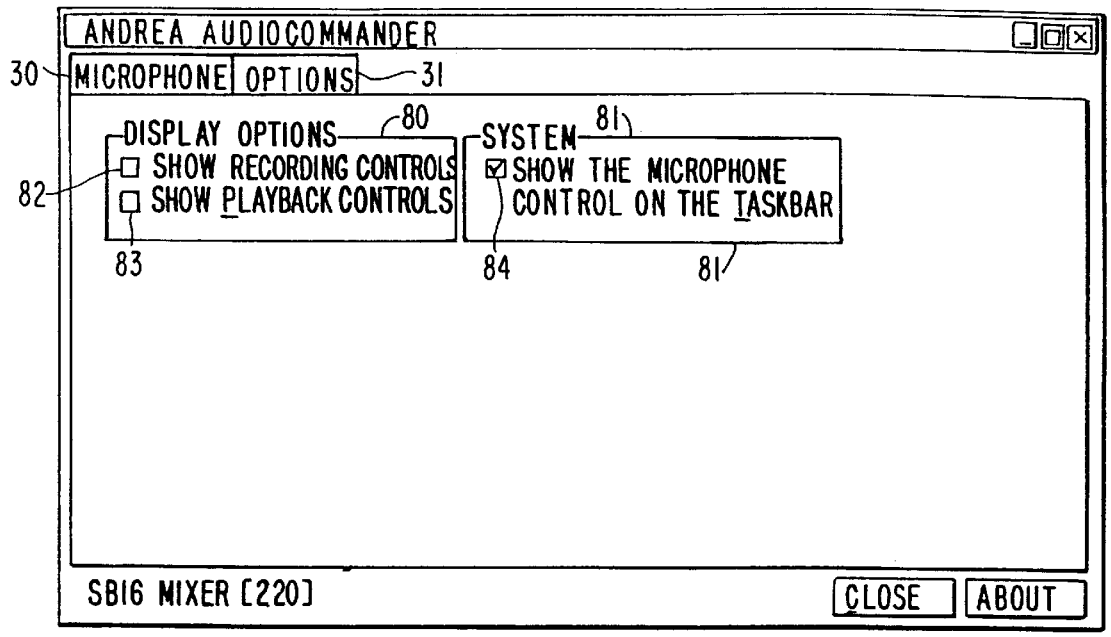
FIG. 6 is a representative screen display illustrating the features of the options tabbed dialog according to the present invention.
Figure 7:
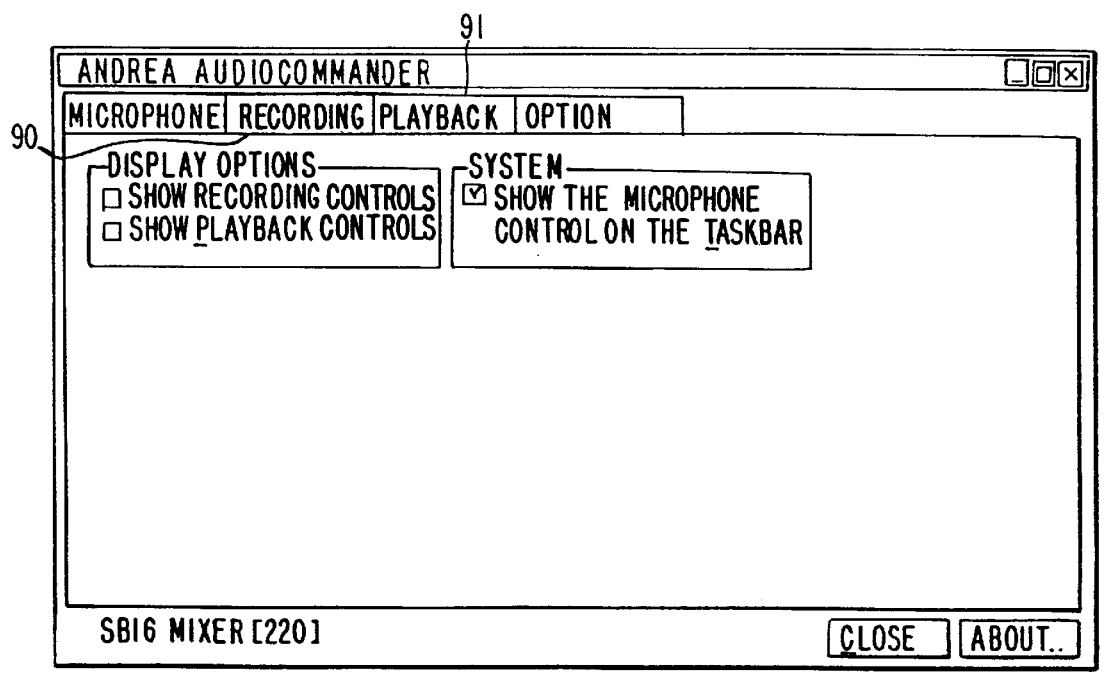
FIG. 7 is a representative screen display similar to FIG. 6, except the recording and playback tabbed dialogs are selected according to the present invention.

In FIG. 6, the options tabbed dialog 31 allows the user the ability to control a plurality of options available within the software system of the present invention, including the placement of the smart icon 28 on the taskbar tray 27 as illustrated in FIG. 3. The options menu is comprised of a display options box 80 and a system box 81. The display options box 80 is comprised of a show recording controls checkbox 82 and a show playback controls checkbox 83. The show recording controls checkbox 82 displays or hides the recording tabbed dialog 90 depending on whether or not the user selected the show the recording controls checkbox 82. Similarly, the show playback controls checkbox 83 displays or hides the playback tabbed dialog 91 depending on whether or not the user selected the show playback controls checkbox 83. If the user selects either or both checkboxes 82 and 83, the tab(s) of the recording tabbed dialog 90 and/or playback tabbed dialog 91 will be displayed as shown in FIGS. 7–11. The system box 81 is comprised of the show the microphone control on the taskbar checkbox 84, which adds or removes the smart icon 28 from the taskbar tray 27 (shown in FIG. 3) depending on whether or not the user selects the show the microphone control on the taskbar show the microphone control on the taskbar checkbox 84. It is preferred that the checkbox 84 be selected at all times to assist proper operation of the microphone.

Figure 8:
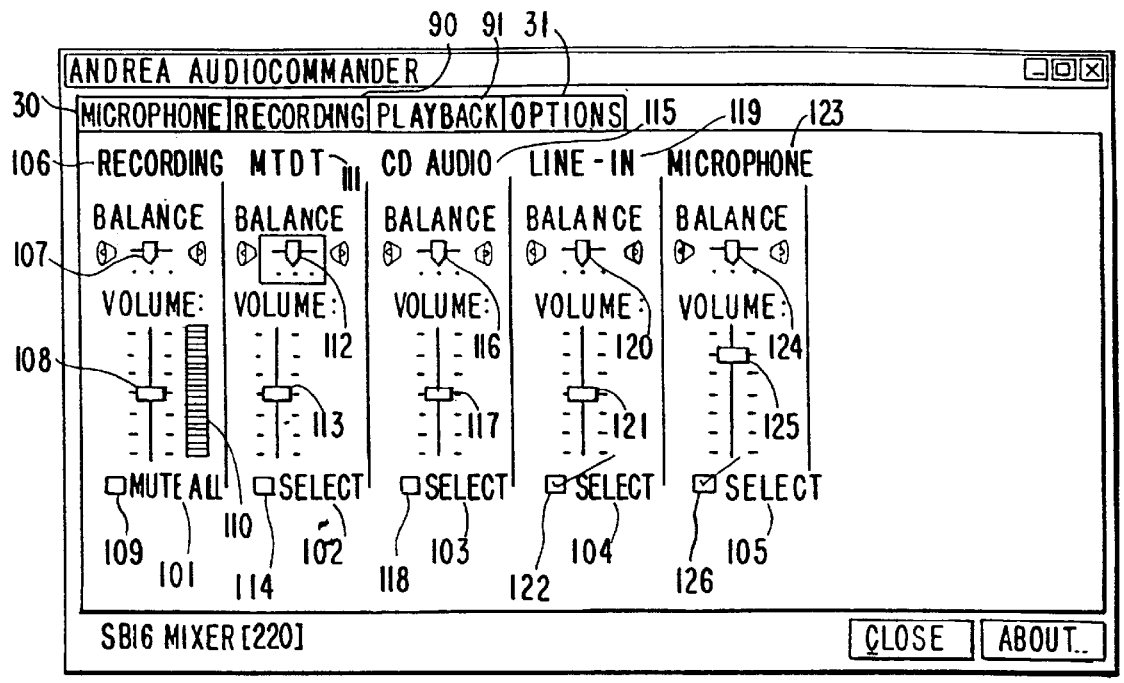
FIG. 8 is a representative screen display illustrating the features of the recording tabbed dialog according to the present invention.
Figure 9:
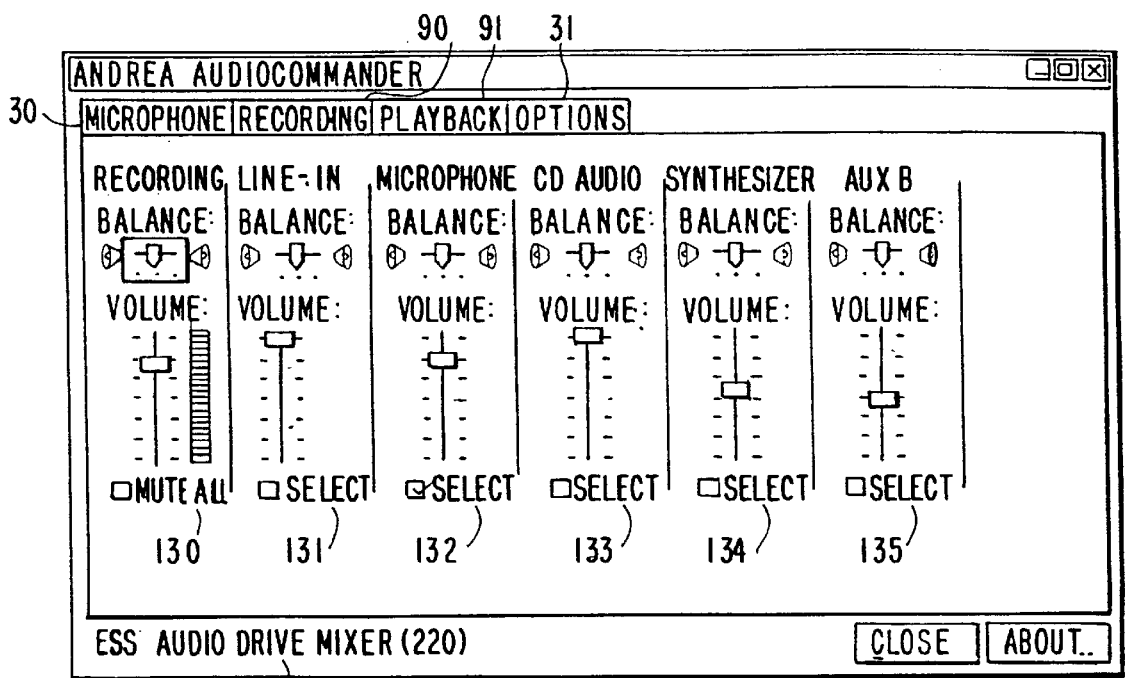
FIG. 9 is a representative screen display similar to FIG. 8 except an alternate computer sound card driver is installed according to the present invention.

In FIG. 8, the recording tabbed dialog 90 provides the user control of all the recording features supported by the Sound Blaster 16 computer sound card and is comprised of a recording group 101, a MIDI group 102, a CD audio group 103, a line-in group 104, and microphone group 105. In FIG. 9, an ESS AudioDrive computer sound card is installed as evidenced by the computer sound card descriptor 136 and accordingly the recording tabbed dialog 90 is comprised of a recording group 130, a linein group 131, a microphone group 132, a CD audio group 133, a synthesizer group 134, and an AuxB group 135. The difference in groups displayed in FIG. 9 from those displayed in FIG. 8 illustrate how the present invention adjusts according to the requirements and capabilities of the different computer sound cards installed in the WINDOWS computer.

In FIG. 8, the recording group 101 contains a recording label 106 identifying a balance control 107, a volume control 108, a mute all checkbox 109, and a VU meter 110. The recording group 101 functions identically to and adjusts the same computer sound card settings as the recording group 58 of the recording box 36 of the microphone tabbed dialog 30 shown in FIG. 4. The MIDI group 102 contains a MTDT label 111 identifying a balance control 112, a volume control 113, and a select checkbox 100 to adjust the computer sound card MTDT stereo input's balance, gain, and mute settings. The CD audio group 103 contains a CD audio label 115 identifying a balance control 116, a volume control 117, and a select checkbox 118 to adjust the computer sound card CD Audio stereo input's balance, gain, and mute settings. The line-in group 104 contains a line-in label 119 identifying a balance control 120, a volume control 121, and a select checkbox 122 to adjust the computer sound card line-in stereo input's balance, gain, and mute settings. The microphone group 105 contains a microphone label 123 identifying a balance control 124, a volume control 125, and a select checkbox 126. The microphone group 105 functions identically to and adjusts the same computer sound card settings as the microphone group 59 of the recording box 36 of the microphone tabbed dialog 30 shown in FIG. 4.

Figure 10:
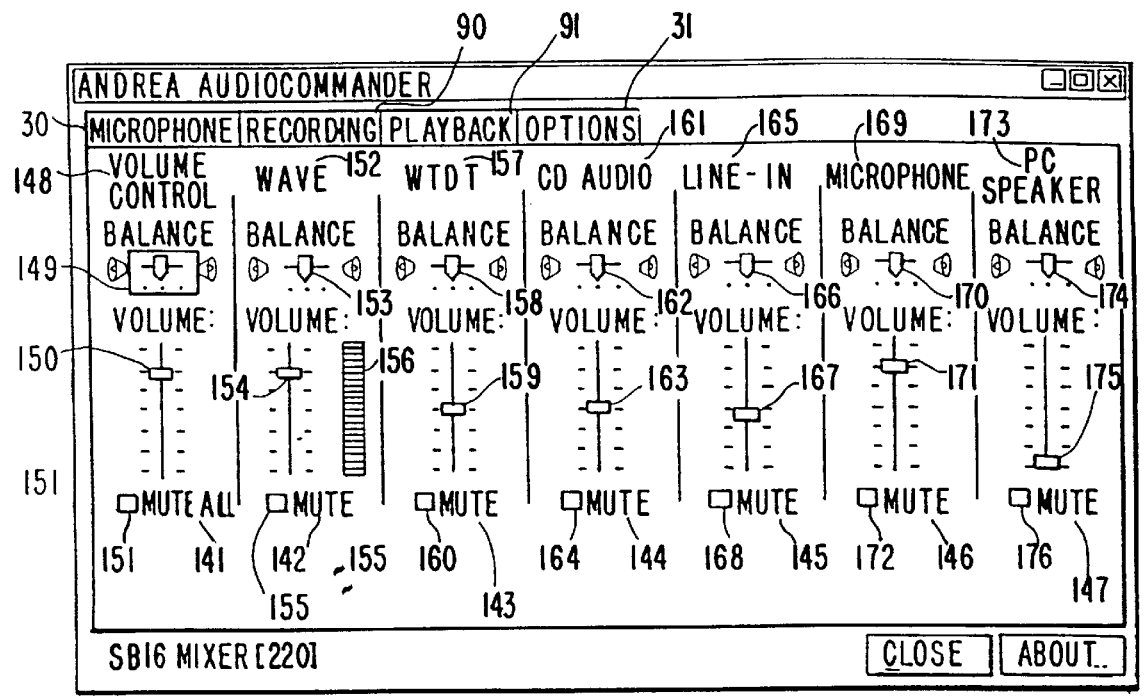
FIG. 10 is a representative screen display illustrating the features of the playback tabbed dialog according to the present invention.
Figure 11:
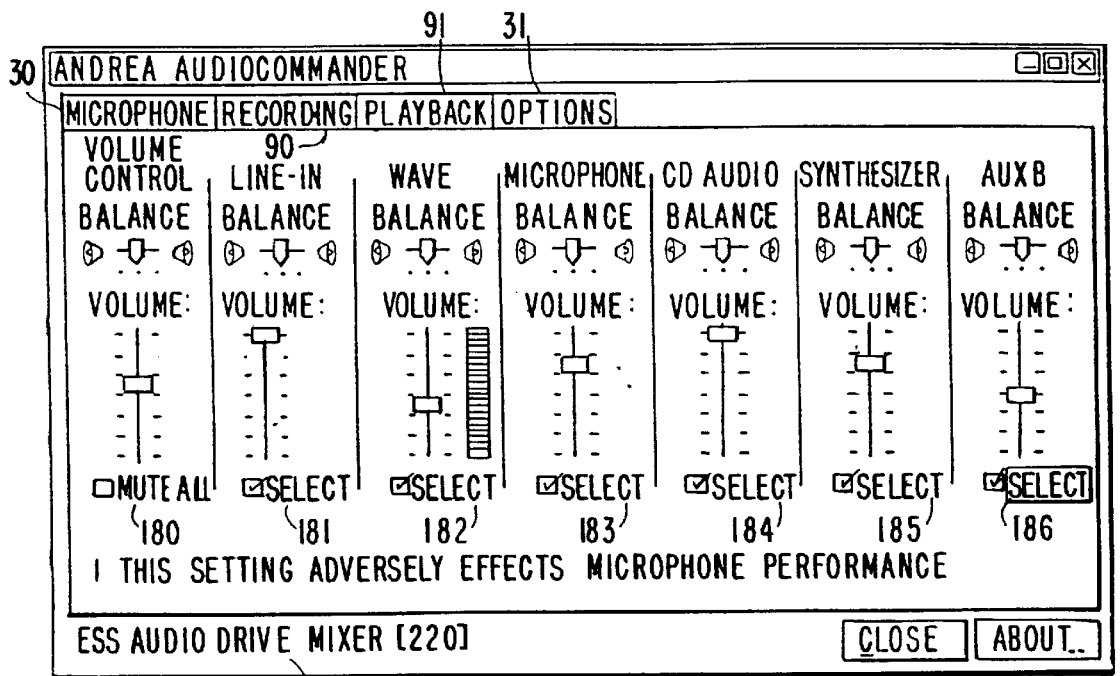
FIG. 11 is a representative screen display similar to FIG. 10 except an alternate computer sound card driver is installed according to the present invention.

In FIG. 10, the playback tabbed dialog 91 provides the user control of all the playback features supported by the Sound Blaster 16 computer sound card and is comprised of a volume control group 141, a wave group 142, a MIDI group 143, a CD audio group 144, a line-in group 145, a microphone group 146, and a PC speaker group 147. In FIG. 11, an ESS AudioDrive computer sound card is installed as evidenced by the computer sound card descriptor 187 and accordingly the playback tabbed dialog 91 is comprised of a volume control group 180, a line-in group 181, a wave group 182, a microphone group 183, a CD audio group 184, a synthesizer group 185, and an AuxB group 186. The difference in groups displayed in FIG. 11 from those displayed in FIG. 10 illustrate how the present invention adjusts according to the requirements and capabilities of the different computer sound cards installed in the WINDOWS computer.

In FIG. 10, the volume control group 141 contains a volume control label 148, a balance control 149, a volume control 150, and a mute all control 151. The volume control group 141 functions identically to and adjusts the same computer sound card settings as the volume control group 60 of the playback box 37 of the microphone tabbed dialog 30 shown in FIG. 4. The wave group 142 contains a wave label 152 identifying a balance control 153, a volume control 154, a mute checkbox 155, and a VU meter 156 to adjust the computer sound card wave stereo output's balance, gain, and mute settings and display the sound level of wave files as they are played. The MIDI group 143 contains a MIDI label 157 identifying a balance control 158, a volume control 159, and a mute checkbox 160 to adjust the computer sound card MIDI stereo output's balance, gain, and mute settings. The CD audio group 144 contains a CD audio label 161 identifying a balance control 162, a volume control 163, and a mute checkbox 164 to adjust the computer sound card CD Audio stereo output's balance, gain, and mute settings. The line-in group 145 contains a line-in label 165 identifying a balance control 166, a volume control 167, and 20a mute checkbox 168 to adjust the computer sound card line-in stereo output's balance, gain, and mute settings. The microphone group 146 contains a microphone label 169 identifying a balance control 170, a volume control 171, and a mute checkbox 172 to adjust the computer sound card microphone monaural output's gain and mute settings. The microphone balance control 170 is permanently set to the center position by the computer sound card driver and is not adjustable by the user. The microphone mute checkbox 172 performs the same function as the check to prevent speaker feedback into microphone checkbox 57 shown in FIG. 4 to prevent speaker feedback into the microphone. The PC speaker group 147 contains a PC speaker label 173 identifying a balance control 174, a volume control 175, and a mute checkbox 176 to adjust the computer sound card PC speaker monaural output's gain and mute settings. The PC speaker balance control 174 is permanently set by the computer sound card driver to the center position and is not adjustable by the user.

Figure 12:
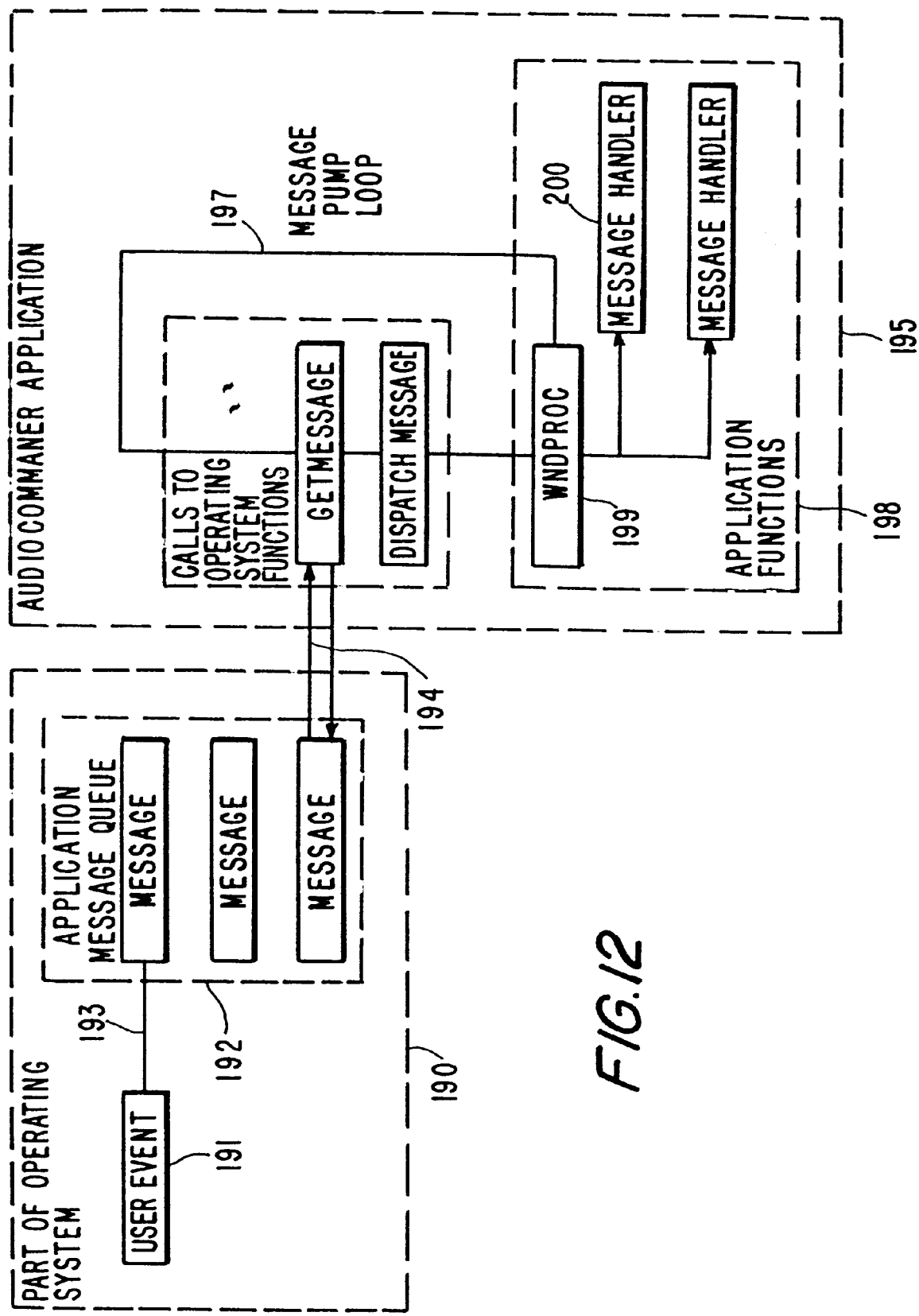
FIG. 12 is a flowchart illustrating the operations of the present invention with a WINDOWS 95 or WINDOWS NT operating system.

FIG. 12 illustrates a block diagram of the present computer system 195 when operating in a WINDOWS 95 or WINDOWS NT environment. A WINDOWS operating system 190 is an event-based, message-driven operating system. During the execution of the present computer system 195, every time the user takes an action that affects a window screen by clicking on the mouse, the user's action triggers a user event 191. Each time the user event 191 is triggered, the WINDOWS operating system 190 sends a message 193 to the present computer system 195 so that the present computer system 195 can handle the user event 191. When the WINDOWS operating system 190 detects the user event 191 and generates the message 193 in response, it places the message 193 in a message queue 192 that is dedicated to the application program 195. When the present computer system 195 needs to determine whether any user events 191 have occurred and what kind of event they are, the present computer system 195 gets the information it needs by retrieving message 194 that the WINDOWS operating system 190 has placed in the message queue 192.

To retrieve message 194, the present computer system 195 repeatedly checks the status of the message queue 192 by executing a series of statements that execute in a message pump loop 197. Each time the present computer system 195 receives the message 194, the window procedure (WndProc) 199 determines how the message 194 should be handled. The present computer system 195 then passes information relating to the message 194 to a message handler 200. The message handler 200 is specially designed to implement much of the present computer system's 195 individual behavior.

Furthermore, although preferred embodiments of the present invention and modifications thereof have been described in detail herein, it is to be understood that this invention is not limited to those precise embodiments and modifications, and that other modifications and variations may be affected by one skilled in the art without departing from the spirit and scope of the invention as defined by the appended claims.

What is claimed is:

1. A method for configuring a computer having a WINDOWS operating system with means for storing/retrieving data to/from a medium for use with audio applications, said data including a plurality of sets of default computer sound card settings respectively corresponding to a plurality of types of computer sound cards, said method comprising the steps of:

installing the data stored in the medium to operate as an application having a menu having different formats for each type of computer sound card;

querying the computer sound card driver to determine the type of computer sound card installed;

displaying on said WINDOWS operating system said menu having a particular format of said different formats corresponding to the detected computer sound card; and inputting default settings effecting microphone performance for the particular type of computer sound card detected.

2. A method according to claim 1, wherein the menu format is dialog-based.

3. A method according to claim 1, wherein the means to install data stored in a medium is a computer hard drive.

4. The method according to claim 1 further comprising the step of establishing a smart icon on the taskbar tray of the WINDOWS operating system.

5. A method according to claim 1, wherein said menu format provides selectable settings to control a gain of an input of said microphone.

6. A method according to claim 1 a personal computer having a microphone for audio applications, comprising the steps of:

querying said personal computer to detect said microphone; and inputting variable settings to control a gain of an input of said microphone.

7. A method according to claim 2, wherein menu format includes computer sound card settings for microphone operations.

8. A method according to claim 4 comprising the additional step of:

providing a set default means on the taskbar tray to allow the user to establish nominal settings means for all microphone controls to ensure effective performance for microphone applications.

9. A method according to claim 6, further comprising the step of displaying a menu including user-selectable microphone settings to control said gain of the input of said microphone.

10. A method according to claim 7, wherein the computer sound card settings include a balance, volume, and mute settings.

11. A method according to claim 7, wherein the computer sound card settings include a balance, volume, and select settings.

12. A computerized system for controlling the computer sound card audio functions in a computer having a WINDOWS operating system and at least one of a plurality of types of computer sound cards for use with a certain audio application, said system comprising:

a data means installed in the computer to determine computer sound card capabilities and appropriate settings of the particular type of computer sound card coupled to said computer from the plurality of types of computer sound cards;

a plurality of tabbed means displayed on a computer screen that allow the user to select which audio settings to manipulate for the certain audio application;

an alert displayed on the tabbed means to notify the user of individual controls which are set improperly;

means to set all computer sound card microphone related settings including settings effecting microphone performance to nominal default values; and alert means displayed on the taskbar tray to notify the user of improper audio settings that are not supported by said particular type of computer sound card.

13. A system according to claim 12, wherein said audio functions comprise at least a balance controller and a volume slider controller displayed in tabbed dialogs.

14. A system according to claim 13, wherein the audio functions comprise a mute setting, select setting, or VU meter displayed in tabbed dialogs.

15. A system according to claim 14, wherein the tabbed dialogs comprise at least a microphone tabbed dialog and options tabbed dialog.

16. A system according to claim 15, wherein the tabbed means comprise at least a microphone tabbed dialog, a recording tabbed dialog, a playback tabbed dialog, and an options tabbed dialog.

17. A system according to claim 16, wherein the recording tabbed dialog controls a plurality of computer sound card audio inputs settings.

18. A system according to claim 16, wherein the playback tabbed dialog controls a plurality of computer sound card output settings.

19. A system according to claim 16, wherein the options tabbed dialog controls the display of the recording tabbed dialog, playback tabbed dialog, and smart icon alert means displayed on the taskbar tray.

20. A computerized system for controlling the computer sound card audio functions in a computer having a WINDOWS operating system and at least one of a plurality of types of computer sound cards for use with a certain audio application, said system comprising:

a data means installed in the computer to determine computer sound card capabilities and appropriate settings of the particular type of computer sound card coupled to said computer from the plurality of types of computer sound cards;

a plurality of tabbed means displayed on a computer screen that allow the user to select which audio settings to manipulate for the certain audio application;

an alert displayed on the tabbed means to notify the user of individual controls which are set improperly;

means to set all computer sound card microphone related settings to nominal default values;

alert means displayed on the taskbar tray to notify the user of improper audio settings that are not supported by said particular type of computer sound card;

at least a balance controller and a volume slider controller displayed in tabbed dialogs;

wherein the audio functions comprise a mute setting, select setting, or VU meter displayed in tabbed dialogs;

wherein the tabbed dialogs comprise at least a microphone tabbed dialog and options tabbed dialog;

wherein the tabbed means comprise at least a microphone tabbed dialog, a recording tabbed dialog, a playback tabbed dialog, and an options tabbed dialog; and wherein the microphone tabbed dialog controls a gain of either a microphone input or other settings effecting microphone performance.

21. A method for configuring a computer having a WINDOWS operating system for use with an audio application, said method comprising the steps of:

querying the computer to determine the type of computer sound card installed from among a plurality of types of computer sound cards; and displaying a menu having settings of the detected computer sound card, wherein at least one of said settings controls a balance of a microphone coupled to said computer which sets a balance between at least two sound receiving devices of said microphone to effect a change in the characteristics of the sound received by said microphone.

22. The method according to claim 21, wherein said balance between said at least two sound receiving devices changes a noise-cancelling characteristic which cancels noise in the sound received by said microphone.

23. The method according to claim 21, wherein said balance between said at least two sound receiving devices changes the direction in which said microphone primarily receives sound.

\* \* \* \* \*